United States Patent [19]

Rajakovics

[11] Patent Number: 4,675,603
[45] Date of Patent: Jun. 23, 1987

[54] APPARATUS FOR DETERMINING THE POSITION OF AN OBJECT

[75] Inventor: Gundolf E. Rajakovics, St. Stefan, Austria

[73] Assignee: Rudolf Schmidt, Armaturen- u. Gusswerk Gesellschaft mbH, Villach, Austria

[21] Appl. No.: 624,594
[22] PCT Filed: Oct. 3, 1983
[86] PCT No.: PCT/AT83/00030
§ 371 Date: Jun. 5, 1984
§ 102(e) Date: Jun. 5, 1984
[87] PCT Pub. No.: WO84/01427
PCT Pub. Date: Apr. 12, 1984

[30] Foreign Application Priority Data

Oct. 5, 1982 [AT] Austria .................................. 3682/82

[51] Int. Cl.[4] .................. G01B 7/10; G01N 27/72; G01R 33/12
[52] U.S. Cl. .................................. 324/208; 324/239; 324/227; 336/45; 340/870.31
[58] Field of Search ............... 324/207, 208, 228, 226, 324/225, 227, 234, 236, 237–243; 336/45; 340/870.31, 870.36, 870.35, 870.32; 331/65

[56] References Cited

U.S. PATENT DOCUMENTS

| | | | |
|---|---|---|---|
| 1,307,093 | 6/1919 | Gardner | 336/45 X |
| 3,654,549 | 4/1972 | Maurer et al. | 324/208 |
| 3,777,255 | 12/1973 | Young et al. | 336/45 X |
| 4,134,065 | 1/1979 | Bauer et al. | 324/208 |
| 4,238,844 | 12/1980 | Ueda et al. | 324/208 X |
| 4,282,485 | 8/1981 | Pauwels et al. | 324/208 |
| 4,297,698 | 10/1981 | Pauwels et al. | 336/45 X |

FOREIGN PATENT DOCUMENTS

| | | | |
|---|---|---|---|
| 844985 | 7/1981 | U.S.S.R. | 324/208 |
| 844989 | 7/1981 | U.S.S.R. | 324/208 |
| 853369 | 8/1981 | U.S.S.R. | 324/208 |
| 855378 | 8/1981 | U.S.S.R. | 324/208 |
| 894771 | 12/1981 | U.S.S.R. | 324/207 |
| 914932 | 3/1982 | U.S.S.R. | 324/208 |

OTHER PUBLICATIONS

Ellis et al, "Moving Coil Linear Variable Differential Transformer", Review of Scientific Instruments, vol. 49, No. 3, Mar. 1978, pp. 398–400.

Primary Examiner—Reinhard J. Eisenzopf
Assistant Examiner—Warren S. Edmonds

[57] ABSTRACT

An apparatus for determining the position of an object has an outer fixed field winding extending along an axis, a source for energizing the field winding with alternating current and thereby creating a magnetic field, and an inner coreless detecting winding displaceable coaxially in the field winding. Thus the field induces a voltage in the inner winding. A link displaces the detecting winding axially in the field winding with the object and thereby changes the voltage induced by the field in the detecting winding. An equalizing winding coaxial between the field winding and the detecting winding is fixed in the field winding. The field also induces a voltage in the equalizing winding. An electronic unit divides the voltages induced in the detecting and equalizing windings into each other and derives a detection signal corresponding to the position of the object and inner winding relative to the outer winding. Disturbances in the field will equally affect the voltages of the equalizing and detecting windings, and the division operation will cancel out the variations thus caused.

7 Claims, 2 Drawing Figures

1

APPARATUS FOR DETERMINING THE POSITION OF AN OBJECT

FIELD OF THE INVENTION

The present invention relates to an inductive position and motion sensor. More particularly this invention concerns such a sensor used as an input for a control system.

BACKGROUND OF THE INVENTION

A standard such inductive sensor has an outer fixed field winding energized by alternating current and a coaxial inner detecting winding that is displaceable axially in the field winding and that has no ferromagnetic core. A link arrangement axially displaces the inner winding with the object whose position is being detected. The voltage induced in the detecting winding is used to establish the position of the thing whose position or motion is being detected, the absolute value of the voltage indicating position and the slope of the voltage/time curve indicating displacement speed.

As a result of the inevitable internal and external disturbances of the magnetic field as well as of the non-homogeneous form of the magnetic field, the sensitivity of these devices does not satisfy strict requirements. For instance changes in temperature can change the conductivity of the wire of the coils, affecting their inductance, or variations in the voltage or frequency of the feed current may be reflected in the readings. Only the most complex and hence failure-prone circuits can repress the effects of outside disturbances enough to make such a sensor highly accurate.

OBJECTS OF THE INVENTION

It is therefore an object of the present invention to provide an improved motion and position detector.

Another object is the provision of such a motion and position detector which overcomes the above-given disadvantages, that is which gives highly accurate readings while remaining of fairly simple construction.

SUMMARY OF THE INVENTION

An apparatus for determining the position of an object according to the invention has an outer fixed field winding extending along an axis, a source for energizing the field winding with alternating current and thereby creating a magnetic field, and an inner coreless detecting winding displaceable coaxially in the field winding. Thus the field induces a voltage in the inner winding. A link displaces the detecting winding axially in the field winding with the object and thereby changes the voltage induced by the field in the detecting winding. An equalizing winding coaxialy between the field winding and the detecting winding is fixed in the field winding. The field also induces a voltage in the equalizing winding. An electronic unit divides the voltages induced in the detecting and equalizing windings into each other and derives a detection signal corresponding to the position of the object and inner winding relative to the outer winding.

Thus according to this invention expensive and inefficient shielding is not used to eliminate the outside disturbances, nor are complex circuits employed to compensate for them. Instead the detection signal is altered by another signal that will be affected substantially identically by the disturbances, so same can be canceled out easily.

According to another feature of this invention, external resistances are connected to the equalizing and detecting windings and are of an ohmage such that they hold the currents of the voltages of the detecting winding and equalizing windings to less than one-hundredth, preferably one-thousandth, of the current of the field winding. This greatly increases accuracy.

According to another feature of this invention the detecting winding is axially at least one-fifth longer than the field winding. The equalizing and field windings are of the same axial length and generally identical. In addition soft-iron rings at the ends of the field coil suppress stray fields.

The link of this invention is a rod passing along the axis through the housing and carrying the detecting coil. A pivot and crank arrangement can move this rod axially in response to anything resembling straigt-line or arcuate movement in virtually any direction near the detecting apparatus of this invention.

DESCRIPTION OF THE DRAWING

The above and other features and advantages will become more readily apparent from the following, it being understood that any feature described with reference to only one embodiment of the invention can be used where possible with any other embodiment. In the accompanying drawing.

SPECIFIC DESCRIPTION

Figure 1:
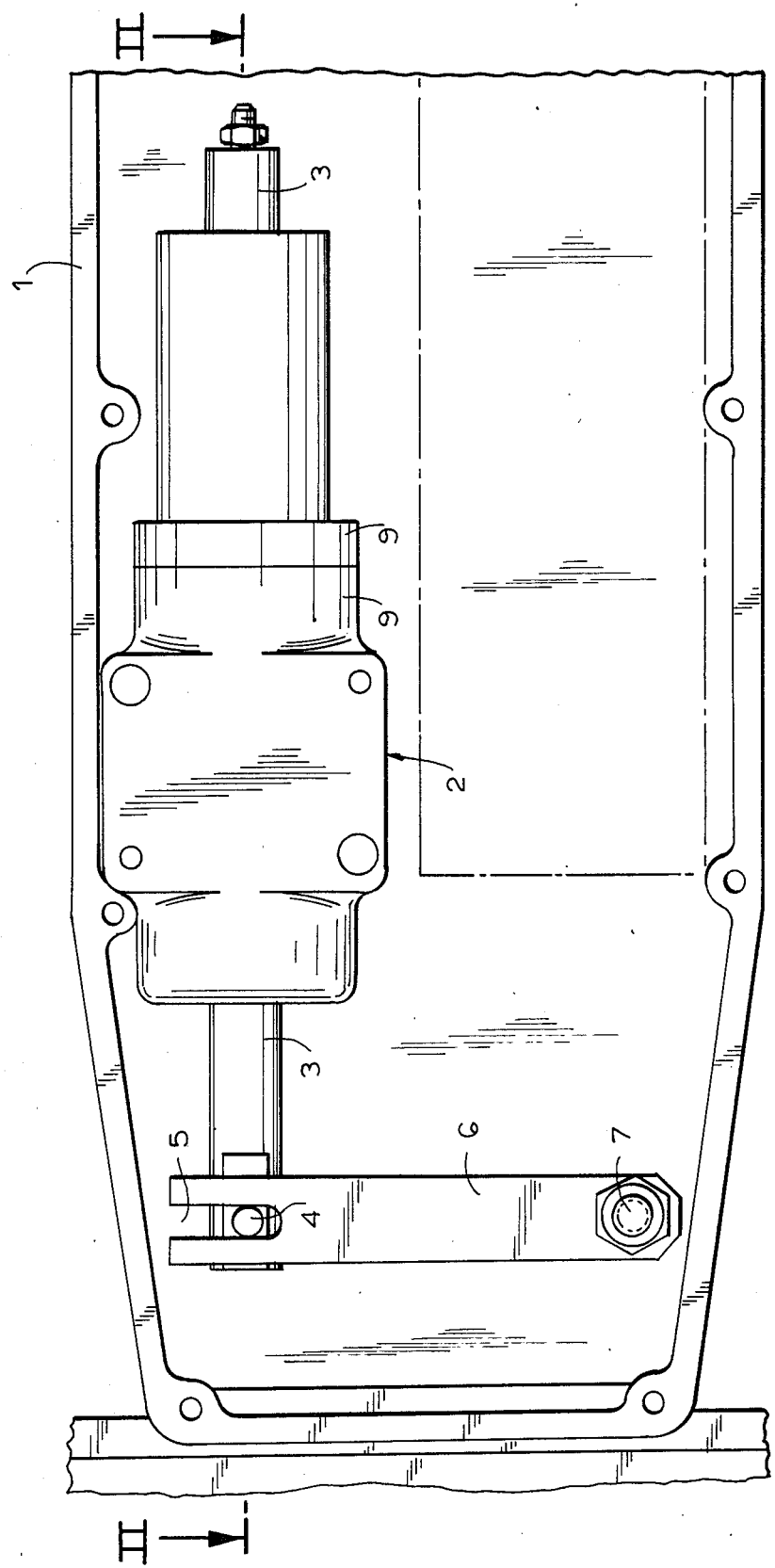
FIG. 1 is a side view of the apparatus of this invention.
Figure 2:
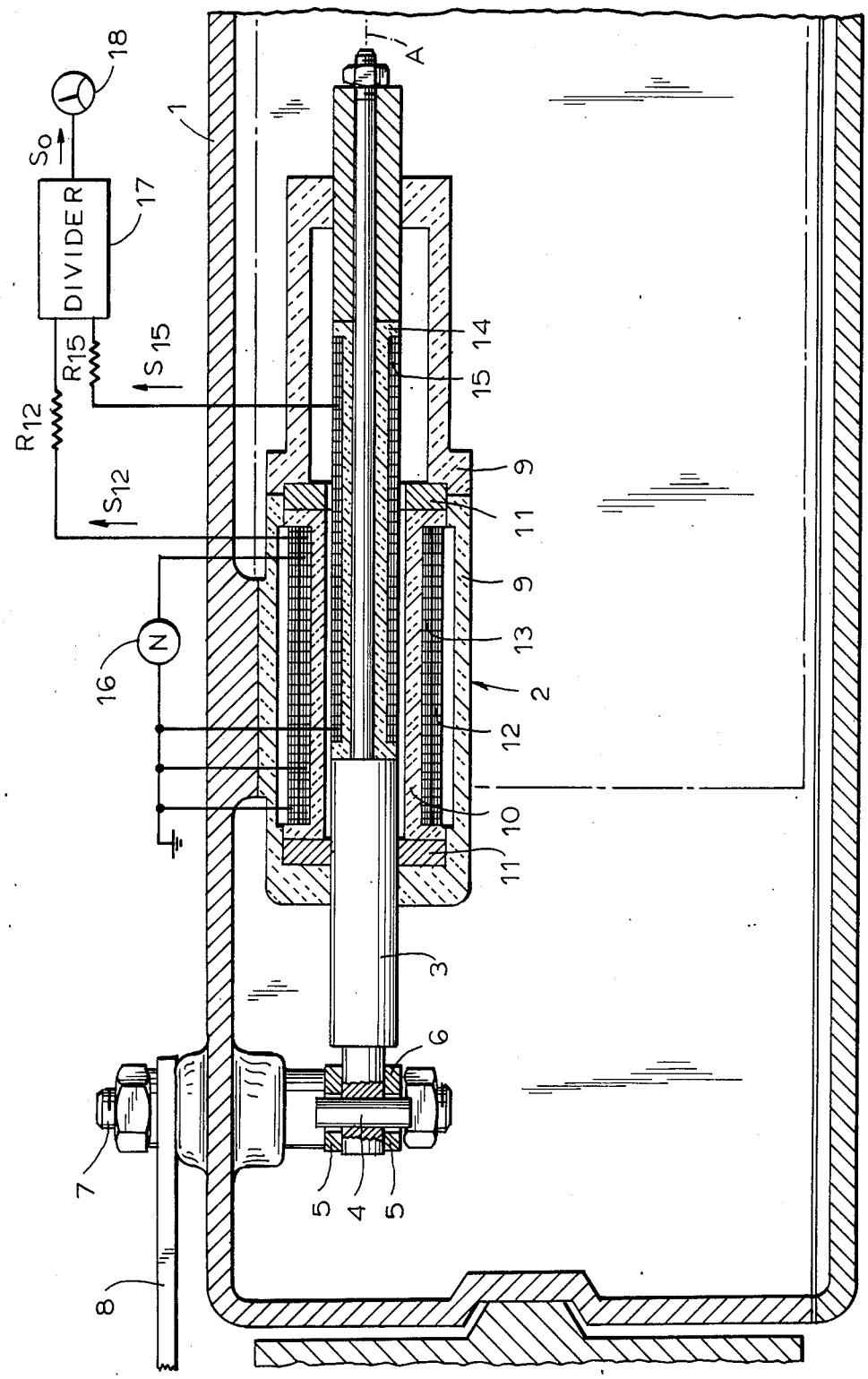
FIG. 2 is a partly schematic sectional view taken along line II—II of FIG. 1.

As seen in FIGS. 1 and 2 a detector 2 is centered on an axis A and is held within a housing 1. A movable core rod 3 extends coaxially through the dielectric two-part housing 9 of the detector 2 and has one end provided with a pivot pin 4 fitting in a slot 5 of an arm 6 extending from another pivot pin 7 that is journaled in the outer housing 1 and whose outer end is connected to a lever 8 which is part of or itself connected to the objects whose position or change in position is to be detected. Thus the axial postion of the rod 3 relative to the housing 9 will correspond to the position of the object attached to the arm 8.

The detector 2 itself comprises a dielectric core tube 10 fixed in the housing 9 and centered on the axis A. This tube 10 supports a stationary field coil or winding 13 energized at about 10 kHz and 10 mA to 20 mA from a source 16 and is axially flanked by two soft- or mild-iron rings 11 that effectively axially delimit the field generated by this coil 13.

The core rod 3 passes through the coil 13 and carries a dielectric core tube 14 on which is mounted a detecting coil or winding 15 that is axially at least 20% longer than the coil 13 so that even when centered the coil 15 will project axially in both directions from the coil 13. This coil is connected via a high-ohmage resistor $R_{15}$ to one input of an electronic arithmetic circuit 17 here constituted as a divider 17. The resistor $R_{15}$, which could be created by combinations of impedances, limits the current of the respective signal $S_{15}$ from the respective coil 15 to at most one-hundredth and preferably one-thousandth the 20 mA–50 mA current flowing in the field winding 13. This minimizes any possibility of this coil 13 inducing any voltages back into the coil 13.

Overlying the field coil 12 on the tube 10 is a further winding or coil 13 which is substantially identical to the coil 12 and axially coextensive therewith. This coil 13 has no ferromagnetic core and is connected through a high-ohmage resistor $R_{12}$ to the other input of the divider 17. This resistor $R_{12}$ also serves to hold down the current in the winding 12 relative to that in the field winding 13. The connections of the windings 12, 13, and 15 are standard.

The voltage induced in the detection and equalizing windings 15 and 12 are proportional to the change with respective to time of the magnetic field and the number of turns of these windings. These induced alternating voltages are measured through high resistances to avoid affecting these voltages and then are rectified. The divider 16 divides the voltage level of the detection coil 15 by that of the equalizing coil 12 and the result of the division is multiplied by a constant which takes into account the particular features of the two windings. The thus obtained value constitutes a detection signal $S_d$ that is fed to a display such as schematically indicated at 18.

Any disturbance of the magnetic field will be effective equally according to this invention on the equalizing and detecting windings. Dividing together the two voltages obtained inductively eliminates the disturbance and gives an exact measurement value.

What is claimed is:

1. An apparatus for determining the position of an object, the apparatus comprising:
    a housing;
    an outer field winding extending along an axis which passes through said housing, and;
    means for energizing the field winding with alternating current and thereby creating a magnetic field;
    an inner coreless detecting winding displaceable coaxically in the field winding, whereby the field induces a voltage in the inner winding;
    link means for displacing the detecting winding axially in the field winding with an object and for thereby changing the voltage induced by the field in the detecting winding;
    an equalizing winding coaxial between the field winding and the detecting winding and stabilized in the field winding, whereby the field induces a voltage in the equalizing winding; and
    means dividing the voltage induced in the detecting and equalizing windings into each other and deriving a detection signal corresponding to the position of the object and inner winding relative to the outer winding.

2. The apparatus defined in claim 1 further comprising external resistances connected to the equalizing and detecting windings of an ohmage such that they hold the currents of the voltages of the detecting winding and equalizing windings to less than one-hundredth of the current of the field winding.

3. The apparatus defined in claim 1 wherein the detecting winding is axially at least one-fifth longer than the field winding.

4. The apparatus defined in claim 1, further comprising soft-iron rings at the ends of the field coil, whereby stray fields are reduced at least axially.

5. The apparatus defined in claim 1 wherein the equalizing and field windings are of the same axial length and generally identical.

6. The apparatus defined in claim 1 wherein the link means includes a rod passing along the axis through the housing and carrying the detecting coil.

7. The apparatus defined in claim 1 wherein the housing is nonconductive.

* * * * *